(12) United States Patent
Bohl et al.

(10) Patent No.: US 11,441,568 B2
(45) Date of Patent: Sep. 13, 2022

(54) ELECTRIC MOTOR COMPRISING PRESSING COOLING AIR CONVEYANCE AND METHOD FOR COOLING COMPONENTS OF THE ELECTRIC MOTOR

(71) Applicant: ebm-papst Mulfingen GmbH & Co. KG, Mulfingen (DE)

(72) Inventors: Katrin Bohl, Künzelsau (DE); Christian Pfaff, Künzelsau (DE)

(73) Assignee: ebm-papst Mulfingen GmbH & Co. KG, Mulfingen (DE)

( * ) Notice: Subject to any disclaimer, the term of this patent is extended or adjusted under 35 U.S.C. 154(b) by 546 days.

(21) Appl. No.: 15/562,318

(22) PCT Filed: Jan. 25, 2016

(86) PCT No.: PCT/EP2016/051412
§ 371 (c)(1),
(2) Date: Sep. 27, 2017

(87) PCT Pub. No.: WO2016/155898
PCT Pub. Date: Oct. 6, 2016

(65) Prior Publication Data
US 2018/0252219 A1    Sep. 6, 2018

(30) Foreign Application Priority Data

Apr. 2, 2015  (DE) ................. 10 2015 105 188.5

(51) Int. Cl.
*H02K 9/06* (2006.01)
*F04D 13/06* (2006.01)
(Continued)

(52) U.S. Cl.
CPC ..... *F04D 13/0646* (2013.01); *F04D 25/0606* (2013.01); *F04D 29/444* (2013.01);
(Continued)

(58) Field of Classification Search
CPC .. H02K 9/06; H02K 9/14; H02K 5/20; H02K 5/18; H02K 9/04; H02K 9/02
(Continued)

(56) References Cited

U.S. PATENT DOCUMENTS

| | | | |
|---|---|---|---|
| 7,224,093 B2 * | 5/2007 | Abadia | H02K 11/215 310/68 B |
| 2009/0028730 A1 * | 1/2009 | Radermacher | F04D 29/4206 417/423.8 |

(Continued)

FOREIGN PATENT DOCUMENTS

| | | |
|---|---|---|
| JP | 2000224821 A | 8/2000 |
| JP | 2004197714 A | 7/2004 |
| WO | WO-2014019853 A2 | 2/2014 |

OTHER PUBLICATIONS

International Search Report (in German with English Translation) for PCT/EP2016/051412, dated May 20, 2016; ISA/EP.

*Primary Examiner* — Bryan R Perez
(74) *Attorney, Agent, or Firm* — Harness, Dickey & Pierce, P.L.C.

(57) ABSTRACT

The invention relates to an electric motor comprising an electronics housing in which motor electronics are accommodated, a stator bush for accommodating a stator and which is axially adjacent to the electronics housing, and a cooling impeller which is axially adjacent to the stator bush and which can be driven via a rotor, wherein a fluidically connected axial through-channel is provided in the stator bush and in the electronics housing, through which channel a cooling air flow generated by the cooling impeller can be conveyed, and wherein the cooling impeller has a blade geometry such that, in normal operation of the electric motor, the cooling air flow is drawn in radially from outside
(Continued)

Figure 1:
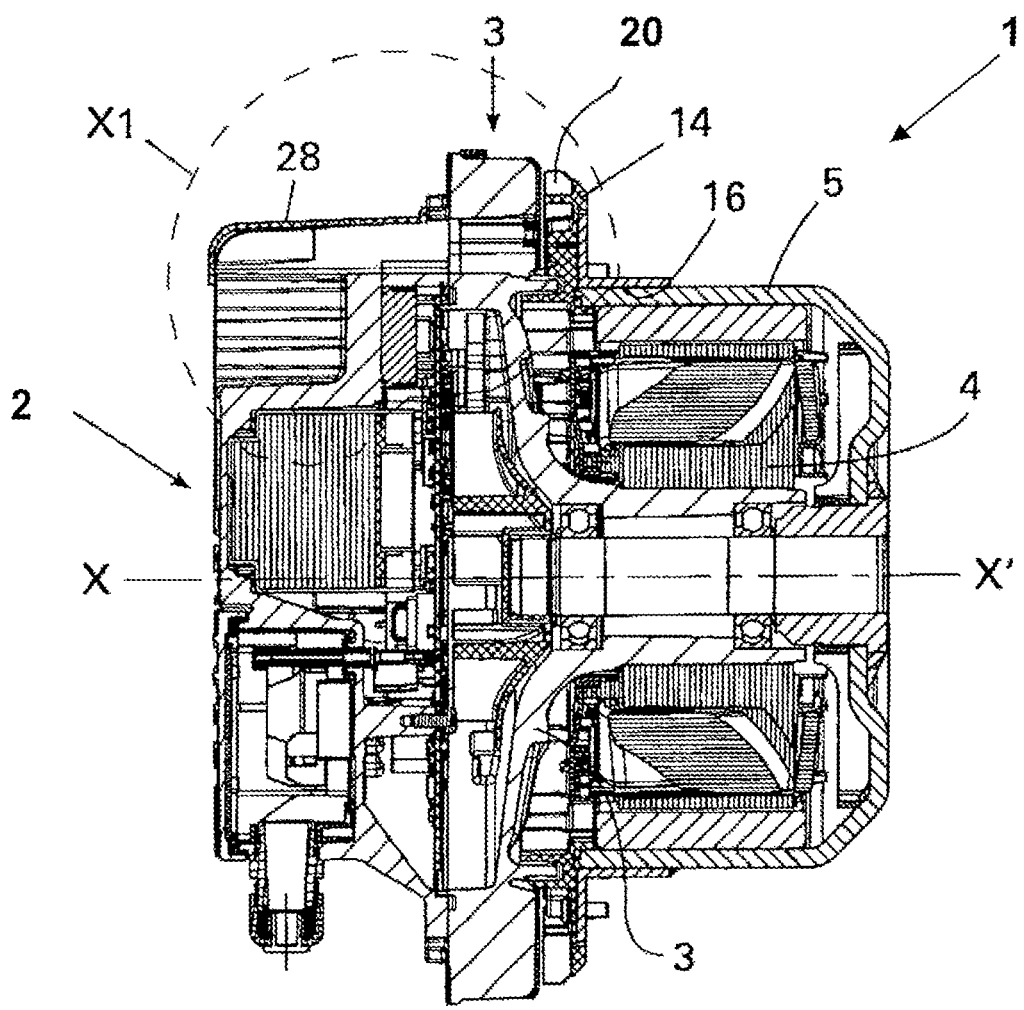

at a peripheral radial air inlet of the cooling impeller and pressed through the through-channel in axial direction.

9 Claims, 3 Drawing Sheets

(51) Int. Cl.
*H02K 9/14* (2006.01)
*H02K 11/33* (2016.01)
*F04D 25/06* (2006.01)
*F04D 29/44* (2006.01)

(52) U.S. Cl.
CPC ................ *H02K 9/06* (2013.01); *H02K 9/14* (2013.01); *H02K 11/33* (2016.01)

(58) Field of Classification Search
USPC .............................................. 310/89, 52, 54
See application file for complete search history.

(56) References Cited

U.S. PATENT DOCUMENTS

| | | |
|---|---|---|
| 2012/0262021 A1 | 10/2012 | Lafontaine et al. |
| 2015/0263591 A1 | 9/2015 | Maschke et al. |

\* cited by examiner

ELECTRIC MOTOR COMPRISING PRESSING COOLING AIR CONVEYANCE AND METHOD FOR COOLING COMPONENTS OF THE ELECTRIC MOTOR

CROSS REFERENCE TO RELATED APPLICATIONS

This application is a U.S. National Phase Application under 35 U.S.C. 371 of International Application No. PCT/EP2016/051412 filed on Jan. 25, 2016 and published in German as WO 2016/155898 A1 on Oct. 6, 2016. This application claims priority to German Application No. 10 2015 105 188.5 filed on Mar. 31, 2015. The entire disclosures of all of the above applications are incorporated herein by reference.

The invention relates to an electric motor with an electronics housing and an adjacently arranged stator bush, wherein, via a cooling impeller, a cooling air flow drawn in from outside is conveyed into the interior of the electronics housing and of the stator bush. The invention further relates to a method for cooling components of the electric motor.

The electric motors according to the invention are used, in particular, for driving fans. In this context, they are generally mounted via the stator bush on fastening walls or support constructions, whereby an effective cooling is made difficult. The performance range as well as the service life of the electric motors are determined by factors including the component temperatures reached in operation, particularly the temperatures of the integrated motor electronics, electric power components, bearings and motor drive components.

It is known from the prior art to cool the temperature-sensitive components actively by means of a cooling impeller integrated in the motor structure. Here, in order to achieve a satisfactory cooling action, it must always be ensured that the cooling air flow generated by the cooling impeller is conveyed as directly as possible to the motor components to be cooled, in particular the electronics components, in order to be able to exploit the largest possible temperature difference between the cooling air flow and the components to be cooled. In the construction, one specifically avoids running the cooling air flow beforehand inside the motor past other components that increase the temperature thereof. Therefore, in the prior art, it is always provided that the cooling air flow is drawn in in the area of the electronics housing and conveyed over or along the electronics components, in order to achieve a cooling of the sensitive components that is due primarily to the temperature difference. However, the disadvantage of this solution is that the air entering the cooling impeller was conveyed beforehand through electric motor components such as the electronics housing or the stator bush and causes a stationarily asymmetric, turbulent inflow to the cooling impeller, resulting in high noise generation by the cooling impeller.

Therefore, the underlying aim of the invention is to provide an electric motor, in which sufficient cooling of the temperature-sensitive components is ensured, while the noise generated by the cooling impeller is clearly reduced. Furthermore, the aim of the invention is to provide a method for cooling such an electric motor.

According to the invention, the electric motor here has an electronics housing with integrated motor electronics, a stator bush for accommodating a stator, which bush is arranged axially adjacent to the electronics housing, and a cooling impeller which is arranged axially adjacent to the stator bush and which can be driven via a rotor. In the stator bush and the electronics housing, a fluidically connected axial through-channel is provided, through which a cooling air flow generated by the cooling impeller is conveyed. Furthermore, the cooling impeller has a blade geometry by means of which, in normal operation of the electric motor, the cooling air flow is drawn in radially from outside at a peripheral radial air inlet of the cooling impeller and is conveyed or pressed through the through-channel in axial direction.

As a result of the fact that the cooling impeller draws in the cooling air flow from the surroundings, the flow entering from outside (surrounding air) into the cooling impeller is unimpeded and substantially turbulence-free. The noise generation when the air enters the cooling impeller, in particular during contact with the blades of the cooling impeller, is measurably clearly lower. Particularly, rotational noise generated in the case of a stationarily asymmetric inflow and a cooling impeller that draws in is reduced due to the design according to the invention with radial drawing and a pressing axial outflow.

As a measurable difference in comparison to a design with drawing in through the housing according to the prior art, in the solution according to the invention with a cooling air flow pressing through the housing, the result is a noise reduction of the sound pressure level in the first rotational noise (blade passing noise/frequency) or the first blade passing noise of more than 20-30% (for example, from 93 dB to 72 dB and from 80 dB to 57 dB). The rotational noise here is composed of the rotation tone and its harmonics. The frequency of the rotational tone is the product of the rotational speed of the fan and the number of blades. The harmonics of the rotational tone are in each case a whole-number multiple thereof. For the respective frequency of the rotational tone and its harmonics, excessive increases of the sound pressure level result. They are particularly high in the low-frequency range.

According to the invention, it is actively taken into consideration that the air drawn in via the cooling impeller in radial circumferential direction is not supplied directly to the electronics housing or to the electronics components accommodated therein, but is instead conveyed via the through-channel through the stator bush. Here, a certain slight preheating can occur; however, this preheating is compensated by higher turbulence degrees and vortexing of the cooling air flow when it is radiated from the cooling impeller and flows into the through-flow(s) through the through-channel. The increased air movement along the stator bush and the electronics housing leads to a more efficient heat transfer, resulting in turn in a lower absolute volume flow being necessary to achieve a similar cooling. The increased air movement therefore compensates for the higher initial temperature during the flow past the components to be cooled. As a result of the low volume flow, the necessary drive power of the cooling impeller is reduced furthermore.

An additional advantageous aspect of the invention is the fact that the cooling impeller no longer draws in the cooling air axially in the electronics housing, but rather radially adjacently to the stator bush. Frequently, the electronics housing is installed in a such a manner that, with the air opening thereof, it faces outward into the environment, and there is a risk of drawing in air contaminants, leaves or the like and clogging of the air opening on the electronics housing. Moreover, leaves can accumulate on the electric motor housing when the electric motor stands idle and prevent the drawing in of cooling air if the air opening faces upward in the installed state. In the solution according to the invention with a cooling impeller which draws in radially and blows out axially on the electronics housing, accumulated leaves are blown away. In addition, other contaminants are shut out, since the radial drawing-in area of the cooling impeller is usually only exposed to flow of clean air. Consequently, cleaning work on the motor is necessary only rarely or not at all.

In an advantageous design of the invention, the blade geometry of the cooling impeller is designed with forward curvature. As a result, a radial drawing in and an axially out-blowing pressing flow are generated.

In an embodiment of the invention, it is provided that the through-channel extends along the stator bush, along the electronics housing, and to an air outlet on the electronics housing. The cooling air flow can here absorb heat both from the stator bush and the components connected thereto as well as from the electronics housing and the electronics components arranged therein, and remove said heat.

The through-channel is designed with variable cross section, and, in an embodiment example, in such a manner that the volume thereof is greater many times over in an area of the electronics housing compared to an area of the stator bush. This means that the through-channel is clearly larger spatially in the area of the electronics housing and flows over a large area around the electronics components.

To further strengthen the cooling effect, cooling ribs are formed on the electronics housing and/or the stator bush, cooling ribs which are directed at least in sections into the through-channel, so that the cooling air flow ensures the largest possible contact area with the components to be cooled.

By geometric measures, the cooling air flow can be influenced further in terms of the direction and turbulence generation thereof. Thus, in an embodiment, on a side facing the cooling impeller, the through-channel on the stator bush has a rounded inlet geometry, in order to guide the flow along the outer wall of the stator bush. In an additional embodiment example, on a side facing the electronics housing, the through-channel on the stator bush has an outlet geometry directed toward the motor electronics. Thereby, exposure of components that become particularly hot to flow can be made possible with comparatively higher cooling.

Furthermore, in an advantageous solution of the invention, in order to guide the cooling air flow, air guide elements are arranged in the through-channel, which can lead to turbulence generation or exposure to flow of certain subassemblies. The air guide elements can be installed in the area of the stator bush and/or of the electronics housing. Here, the air guide elements themselves can be formed as cooling ribs.

The invention moreover comprises a method for cooling electronics components of the electric motor, wherein, in normal operation of the electric motor, the cooling impeller generates a cooling air flow which is drawn in radially from the outside at the circumferential radial air inlet of the cooling impeller and pressed through the through-channel in an axial direction, so that cooling air flow flows at least along the stator bush and the electronics housing to the air outlet on the electronics housing. In addition, all the features described above for cooling the electric motor can be part of the method.

Figure 2:
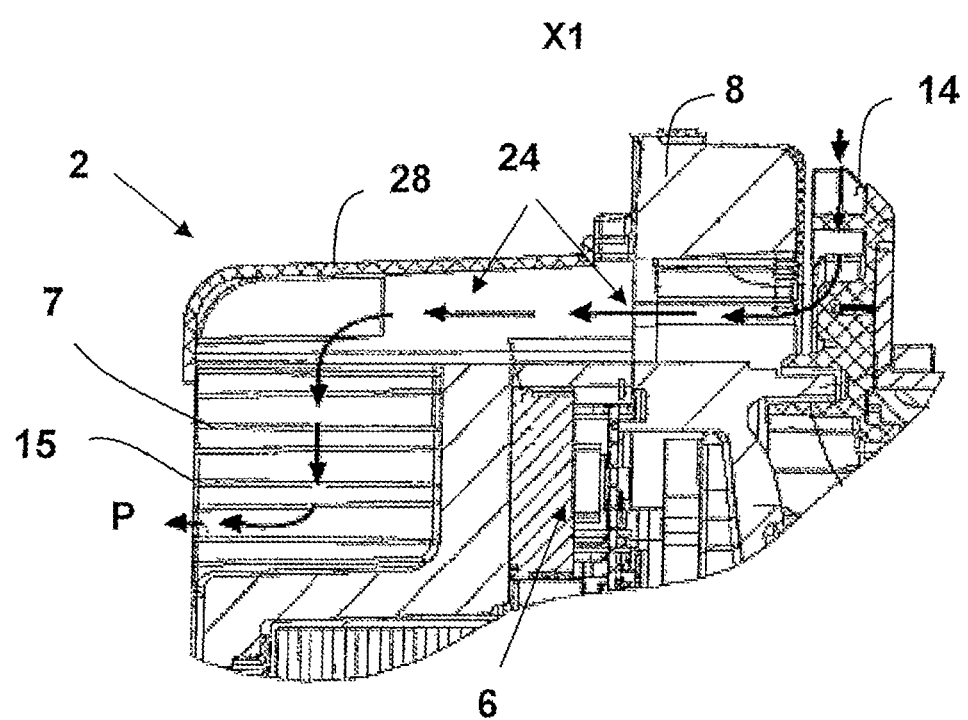

Other advantageous developments of the invention are characterized in the dependent claims and represented in further detail below together with the description of the preferred design of the invention in reference to figures. The figures show:

FIG. 1 a lateral cross section of an electric motor;
FIG. 2 an enlarged partial detail X1 from FIG. 1,
FIG. 3 a detail of a lateral view of a cooling impeller FIG. 4 a diagram for the representation of the noise generation of the cooling impeller at different frequencies.

The figures are diagrammatic examples and show, in FIGS. 1 and 2, an electric motor 1 with an electronics housing 2, a stator with a stator bush 3, a stator sheet stack 4 and motor windings as well as a rotor 5 which, in the design represented, is formed as an external rotor. The stator bush 3 is arranged axially between electronics housing 2 and rotor 5. In the electronics housing 2, the motor electronics for driving and for controlling the motor, in particular commutation electronics with electric power components 6, are accommodated. The electronics housing 2 has a housing cover 28, on which the housing cooling ribs 7 are arranged for cooling the motor electronics within the electronics housing 2. The stator bush 3, on the outer wall thereof facing the rotor 5, has radially extending stator cooling ribs 8 which extend axially in the direction of the rotor 5 and which dissipate the heat generated particularly in the area of the stator ball bearing and the motor windings.

Axially between the stator bush 3 and the rotor 5, the cooling impeller 14, formed as radial fanwheel with blades having a forward curvature, is arranged. In contrast to the radial fanwheels with forward curvature according to the prior art, the air flow enters the cooling impeller 14 from outside and exits on the inner side. The cooling impeller 14 is connected in a rotationally fixed manner to the rotor 5, and, as air inlet, it has a drawing-in opening 20 which is completely circumferential in radial direction, and, as air outlet, it has an axial out-blowing opening 15 facing the stator bush 3. When the motor is running, the cooling impeller 14 draws in surrounding air through the drawing-in opening 20 radially from outside and blows out said air axially at the out-blowing opening 15 in the direction of the through-channel 24.

Through the stator bush 3 and the electronics housing 2, the axial through-channel 24 extends, wherein the volume thereof is increased many times over in the area of the electronics housing 2. Starting from the cooling impeller 14, the through-channel 24 extends along the outer wall of the stator bush 3 and the inner wall of the electronics housing 2 to an axial air outlet 15 on the electronics housing 2.

By means of the cooling impeller 14, the radially drawn in air in the area of the inlet area of the through-channel 24 is axially blown out, so that the cooling air flow enters along arrows P into the through-channel 24 and flows in axial direction over the stator bush 3 and the electronics housing 2 accommodating the electronics components 6. In the area of the stator bush 3, the cooling air flow extends in the through-channel 24 approximately parallel to the motor axis X-X', broadens in the area of the electronics housing 2 and flows over a large area around the components arranged inside the electronics housing 2.

The stator bush 3 and the electronics housing 2 are preferably made of metal, and the cooling impeller 14 is preferably made of plastic.

Figure 3:
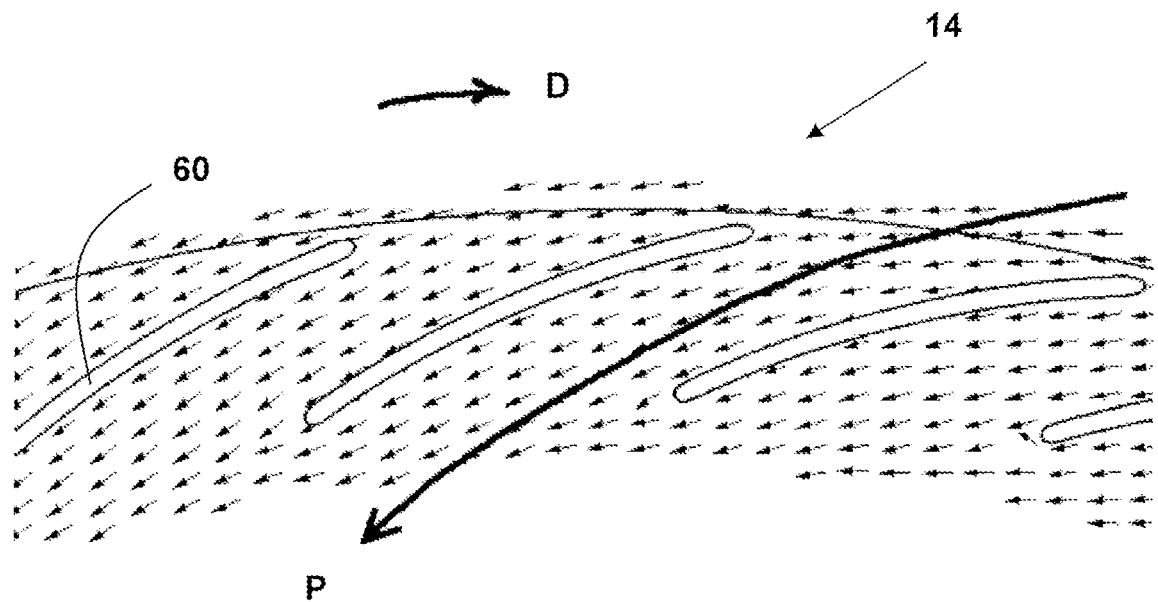

FIG. 3 shows a detail of a lateral view of a cooling impeller 14 with blades 60 having a forward curvature and with a rotation direction D, wherein the blades 60 generate a cooling air flow P which is radially drawn in and axially blown out, in the direction of the through-channel 24.

Figure 4:
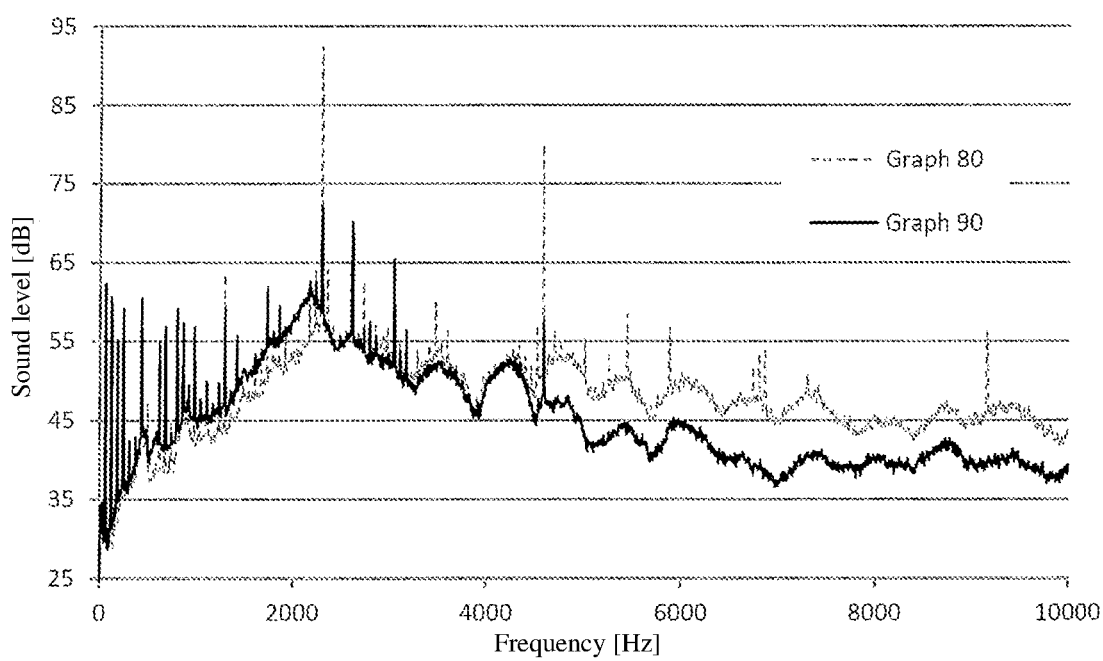

In FIG. 4, the measured result of the sound level versus the frequency of a cooling impeller according to the prior art with axially drawing-in and radially out-blowing flow direction and of a cooling impeller 14 according to the invention is represented in a diagram. The cooling impeller 14 according to the invention is characterized by graph 90, and the impeller according to the prior art is characterized by graph 80. It is shown that, with identical installation situation, the impeller 14 according to the invention has a lower sound level over the entire frequency range than the drawing-in design according to the prior art. The most remarkable differences in the sound level are at frequencies of approximately 2300 Hz and 4600 Hz, wherein the sound levels could be reduced by means of the solution according to the invention from 93 dB to 72 dB, and from 80 dB to 57 dB.

The design of the invention is not limited to the preferred embodiment examples indicated above. Instead, a number of variants are conceivable, which use the represented solution even in designs of fundamentally different type. For example, instead of a single through-channel through the stator bush, a plurality of channels can also be provided, which merge in the area of the electronics housing.

The invention claimed is:

1. An electric motor comprising:
   an electronics housing in which motor electronics are accommodated,
   a stator bush for accommodating a stator, the stator bush being arranged axially adjacent to the electronics housing,
   a cooling impeller is arranged axially between the stator bush and a rotor, the cooling impeller being driven by the rotor, wherein
   a fluidically connected axial through-channel is provided in the stator bush and a fluidically connected axial through channel is provided in the electronics housing, a cooling air flow generated by the cooling impeller being conveyed through the channel through the stator bush and through the electronics housing, and
   the cooling impeller formed as a radial fan wheel having a blade geometry with a forward curvature such that, in normal operation of the electric motor, direction of the cooling air is such that the cooling air is drawn in a radially direction from outside into a peripheral radial air inlet of the cooling impeller and the cooling air is conveyed into and through the through-channel in an axial direction and exits axially from the electric motor.

2. The electric motor according to claim 1, wherein, on the electronics housing and/or the stator bush, cooling ribs are formed, the cooling ribs being directed at least in sections into the through-channel.

3. The electric motor according to claim 2, wherein the cooling ribs extend in an axial direction.

4. The electric motor according to claim 1, wherein the through-channel extends along the stator bush, along the electronics housing, and to an air outlet on the electronics housing.

5. The electric motor according to claim 1, wherein a volume of the through-channel is greater than an area of the electronics housing compared to an area of the stator bush.

6. The electric motor according to claim 1, wherein the through-channel has a rounded inlet geometry on the stator bush on a side facing the cooling impeller.

7. The electric motor according to claim 1, wherein the through-channel on the stator bush, on a side facing the electronics housing, has an outlet geometry directed to the motor electronics.

8. The electric motor according to claim 1, wherein air guide elements are arranged in the through-channel.

9. A method for cooling electronics components of the electric motor according to claim 1, wherein, in normal operation of the electric motor, the method comprises:
   generating a cooling air flow using the cooling impeller, the cooling air being drawn in radially from outside at a peripheral radial air inlet of the cooling impeller and being pressed through the through-channel in an axial direction; and
   directing the cooling air flow such that the cooling air flow flows at least along the stator bush and the electronics housing to the air outlet on the electronics housing.

* * * * *